United States Patent
Sim et al.

(10) Patent No.: US 12,054,668 B2
(45) Date of Patent: Aug. 6, 2024

(54) CHEMICAL TREATMENT SOLUTION FOR FORMATION DAMAGE AT NEAR WELLBORE

(71) Applicant: SEECHEM HORIZON SDN. BHD., Petaling Jaya (MY)

(72) Inventors: Wei Hoe Sim, Pulau (MY); Kah Howe Chan, Shah Alam (MY); Yok Peng Chan, Shah Alam (MY)

(73) Assignee: Seechem Horizon Sdn. Bhd., Petaling Jaya (MY)

( * ) Notice: Subject to any disclaimer, the term of this patent is extended or adjusted under 35 U.S.C. 154(b) by 826 days.

(21) Appl. No.: 17/041,857

(22) PCT Filed: Mar. 19, 2019

(86) PCT No.: PCT/MY2019/050021
§ 371 (c)(1),
(2) Date: Sep. 25, 2020

(87) PCT Pub. No.: WO2019/190304
PCT Pub. Date: Oct. 3, 2019

(65) Prior Publication Data
US 2021/0032529 A1   Feb. 4, 2021

(30) Foreign Application Priority Data
Mar. 29, 2018   (MY) .................... PI 2018701298

(51) Int. Cl.
*C09K 8/524*   (2006.01)
*C09K 8/528*   (2006.01)

(52) U.S. Cl.
CPC ............. *C09K 8/524* (2013.01); *C09K 8/528* (2013.01); *C09K 2208/26* (2013.01)

(58) Field of Classification Search
CPC .... C09K 8/524; C09K 8/528; C09K 2208/26; C09K 2208/32; C09K 8/36
See application file for complete search history.

(56) References Cited

U.S. PATENT DOCUMENTS

| | | | |
|---|---|---|---|
| 2,622,067 A * | 12/1952 | White | C09K 23/00 544/242 |
| 3,876,391 A * | 4/1975 | McCoy | C10L 1/328 516/29 |
| 5,139,088 A | 8/1992 | De Boer et al. | |
| 5,425,422 A | 6/1995 | Jamaluddin et al. | |
| 7,838,467 B2 | 11/2010 | Jones et al. | |
| 8,091,464 B1 | 1/2012 | Imholt et al. | |
| 2006/0166835 A1* | 7/2006 | Yang | C09K 8/536 507/200 |
| 2011/0054042 A1* | 3/2011 | Wu | A23L 29/27 507/225 |
| 2015/0105302 A1* | 4/2015 | Pursley | C09K 8/58 507/202 |

FOREIGN PATENT DOCUMENTS

| | | | |
|---|---|---|---|
| CN | 104583361 A * | 4/2015 | ............. C09K 8/584 |
| EP | 0087277 | 8/1983 | |
| EP | 0134173 | 3/1985 | |
| WO | 2017055508 | 4/2017 | |

OTHER PUBLICATIONS

International Search Report Dated Jun. 17, 2019.
Written Opinion of the International Searching Authority Dated Jun. 17, 2019.
International Preliminary Report on Patentability Dated Mar. 17, 2020.

* cited by examiner

*Primary Examiner* — Kumar R Bhushan
(74) *Attorney, Agent, or Firm* — Preston Smirman; SMIRMAN IP LAW, PLLC

(57) ABSTRACT

An emulsion composition of treating near-wellbore obstruction comprising an aqueous phase in 0.5 to 40% by weight of total composition; an non-aqueous phase in 15 to 90% by weight of total composition; a surfactant un 2 to 60% by weight of total composition; and a compound having a Chemical structure I in 1 to 30% by weight of total composition $R_1—CONH—[R_2—NH—R_3]_n—HNOC—R_4$ (Chemical structure I)

in which $R_1$, $R_2$, $R_3$ and $R_4$ are linear, branched or aromatic carbon-containing substituents having 2 to 26 carbon atoms and n is an integer ranges from 1 to 100, wherein each of the substituents comprises an alkyl group, a carbonyl group, a carboxylic group, an amine group, or an amide group.

9 Claims, No Drawings

CHEMICAL TREATMENT SOLUTION FOR FORMATION DAMAGE AT NEAR WELLBORE

CROSS-REFERENCE TO RELATED APPLICATION

The instant application is a national phase of PCT International Application No. PCT/MY2019/050021 filed Mar. 19, 2019, and claims priority to Malaysian Patent Application Serial No. PI 2018701298 filed Mar. 29, 2018, the entire specifications of both of which are expressly incorporated herein by reference.

FIELD OF INVENTION

The present invention relates to an emulsion for treating formation damage at near-wellbore. More particularly, the emulsion can be formed in-situ in a hydrocarbon reservoir. In the preferred embodiment, the emulsion can be any one or a combination of macroemulsion, a microemulsion and a nanoemulsion.

BACKGROUND OF THE INVENTION

Hydrocarbon production rate tends to decline along the years owing to depletion of the source and decrease in wellbore pressure. Apart from that, a decline in hydrocarbon yield can be accelerated more rapidly by other factors such as solid precipitation/deposition or emulsion blockage near wellbore. The formed precipitates and deposits block the passages in the rock reducing the flow of the hydrocarbon thereby causing reduce in hydrocarbon production. Sometimes, the blockage can lead to zero production in severe situation. In a mature oil well, the presence of water may cause formation of water-in-oil emulsion. This emulsion greatly increases viscosity in the oil. Together with the aggregates and solid particulates such as clay or sand, the viscous oil may end up as immovable emulsion sludge to further aggravate the productivity of the hydrocarbon. Formation of the undesired aggregates or deposits and sludge clogging up the hydrocarbon flow is known as near-wellbore formation damage which requires corresponding intervention to be carried out to rejuvenate the formation so as to resume the hydrocarbon production. Mechanically scrapping off the deposits is one of the common approaches used to restore the hydrocarbon production. Other physical interventions include re-fracturing or re-perforating the rocks to create new channel to resume the hydrocarbon production. However, the treatment by physical interventions sometimes cannot be repeated at the same location hence may not be sustainable. A chemical treatment solution is disclosed herein to provide a sustainable solution to remove the blockage and revive the hydrocarbon production repeatedly. This chemical treatment either removes or inhibits the precipitation or blockage caused by foreign particulate objects such as drilling mud residues, cementing residues, cuttings, drilling fluids, or objects that accumulates inside the wellbore and/or near wellbore such as precipitates, emulsion, hydrocarbon deposits, organic or inorganic scale deposits, solids particulates such as sands, cuttings, clays, minerals that clogging up hydrocarbon flow inside the wellbore. The precipitates and deposits may be caused by asphaltene, wax, inorganic and organic scale, emulsion, clay, mineral deposits, corrosion residues, etc present in the formation.

U.S. Pat. No. 5,139,088 discloses a method of inhibiting asphaltene precipitation through injection of crude oil having high aromaticity and molecular weight. Another method of removing precipitation is described in U.S. Pat. No. 5,425,422 by treating the precipitates with de-asphalted oil. Lirio et al. claim a single phase microemulsions for cleaning formation damage and method of using the described microemulsion in U.S. Pat. Nos. 7,838,467 and 8,091,464. Besides setting out to produce composition with good efficiency, it is important also to produce chemical treatment solution, which is cost effective and environmental friendly as well as good versatility against various formation conditions, especially considering that the like treatments are performed in regular routine to insure stable oil production at the oil or gas wells of different geographical locations.

SUMMARY OF THE INVENTION

The present invention aims to provide a chemical composition for treating or rejuvenating formation damage at near-wellbore to completely or partially restore hydrocarbon production from the reservoir.

Another objective of the present invention is to offer a chemical composition in the form of macro emulsion, micro emulsion, or nano emulsion which is able to remove or inhibit the precipitation or blockage caused by foreign particulate objects such as drilling fluids residues, cementing residues, cuttings, drilling fluids, or objects that accumulates inside the wellbore and/or near wellbore such as precipitates, emulsion, hydrocarbon deposits, organic or inorganic scale deposits, solids particulates such as sands, cuttings, clays, minerals that clogging up hydrocarbon flow inside the wellbore. Such a precipitates and deposits may cause by asphaltene, wax, inorganic and organic scale, emulsion, clay, mineral deposits, corrosion residues, etc.

Further objective of the present invention is to offer a chemical composition capable of re-fluidizing in the near-wellbore formation for wide range of formation and reservoir conditions free from hassles of reduced performance.

At least one of the preceding objectives is met, in whole or in part, by the present invention, in which one of the embodiments of the present invention is an emulsion composition of treating near-wellbore obstruction comprising: an aqueous phase in 0.5 to 40% by weight of total composition; an non-aqueous phase in 15 to 90% by weight of total composition; a surfactant in 2 to 60% by weight of total composition; and a compound having Chemical structure I in 1 to 30% by weight of total composition, $$R_1\text{—CONH—}[R_2\text{—NH—}R_3]_n\text{—HNOC—}R_4 \quad \text{(Chemical structure I)}$$

in which $R_1$, $R_2$, $R_3$ and $R_4$ are linear, branched or aromatic carbon-containing substituents having 2 to 26 carbon atoms and n is an integer ranges from 1 to 100, wherein each of the substituents comprises an alkyl group, carbonyl group, a carboxylic group, an amine group, or an amide group.

As used herein, a "co-surfactant" refers to a compound that participates in aggregation of molecules into a micelle but does not aggregate on its own. Suitable co-surfactant useful with the composition of the present invention is selected from the group consisting of C3 to C18 alcohols, C3 to C18 alkyl lactates, lecithin, C3 to C18 fatty acids, alkane diols, amino acids, and any mixtures derived thereof. In an embodiment, a co-surfactant may be included in the composition of the present invention in an amount ranging from about 1 to 30% by weight of total composition. More particularly, the surfactant and the co-surfactant can be used in a ratio of 20:1 to 1:20.

In one preferred embodiment, the non-aqueous phase is any one or combination of natural plant oil, glycols, esters, fatty acid ester, terpenes, aromatic hydrocarbons, ester, glycol ethers, mineral oil, paraffin oil, diesel, and petroleum distillates.

In one preferred embodiment, the surfactant is selected from the group consisting of a non-ionic surfactant, an anionic surfactant, a cationic surfactant, or any combination thereof.

In another embodiment, the disclosed composition further comprises a corrosion inhibitor, in 1 to 5% by weight of the total composition, selected from the group consisting of phosphate esters, amine salts of carboxylic acid, amine salts of polycarboxylic acid, quaternary ammonium salts, quaternary imminium salts, amidoamines, imidazolines, amides, polyhydroxy amines, polyhydroxy amides, ethoxylated amines, ethoxylated amides, polyaminoacids and any combination derived thereof.

In another embodiment, the disclosed composition further comprises a pour point depressant, in 5 to 40% by weight of total composition, selected from the group consisting of ethylene/alkene copolymers, ethylene/vinyl acetate copolymers, ethylene acrylonitrile copolymers, acrylate ester polymers, methacrylate ester polymers, maleic copolymers, alkyl phenol-formaldehyde resins, hexatriethanolamineoleate esters, polyolefin and any combination derived thereof.

In another embodiment, the disclosed composition further comprises a chelating agent, in 1 to 25% by weight of total composition, selected from the group consisting of ethylenediaminetetraacetic acid, hydroxyethylenediaminetriacetic acid, nitriolotriacetic acid, citric acid, acetylacetone, porphyrin, catechol, dithiolenephosphonic acids and their salts, polyphosphates, phosphate esters, nonpolymericphosphonates, aminophosphonates, polyphosphonatesphosphino polymers, polyphosphinates, polycarboxylates, polysulfonates and any combination derived thereof.

In another embodiment, the disclosed composition further comprises biocide, in 1 to 5% by weight of total composition, selected from the group consisting of chlorine/hypochlorite or bromide/hypochlorite, hypochlorite salts, hypobromite salts, stabilized bromine chloride, hydroxyl radicals, chloramines, chlorine dioxide, chloroisocyanurates, halogen-containing hydantoins, hydrogen peroxide, hydrogen peracetic acid and any combination derived thereof.

In another embodiment, the disclosed composition further comprises acids, in 0.1 to 30% by weight of total composition, in which the acids can be organic such as carboxylic acids, citric acids, phosphorous acids or inorganic acids such as mineral acids, or combination of both.

At least one of the preceding objectives is met, in whole or in part, by the present invention, in which one of the embodiments of the present invention is a compound for use in treatment of formation damage at near-wellbore comprising: a Chemical structure I $R_1$—CONH—$[R_2$—NH—$R_3]_n$—HNOC—$R_4$, in which $R_1$, $R_2$, $R_3$ and $R_4$ are linear, branched or aromatic carbon-containing substituents having 2 to 26 carbon atoms and n is an integer ranges from 1 to 100, wherein each of the substituents comprises an alkyl group, a carbonyl group, a carboxylic group, an amine group, or an amide group.

DETAILED DESCRIPTION OF THE INVENTION

One skilled in the art will readily appreciate that the present invention is well adapted to carry out the objects and obtain the ends and advantages mentioned, as well as those inherent therein. The embodiment describes herein is not intended as limitations on the scope of the invention.

The present invention discloses an emulsion composition for treating formation damage at near-wellbore comprising: an aqueous phase in 0.5 to 40% by weight of total composition; an non-aqueous phase in 15 to 90% by weight of total composition; a surfactant in 2 to 60% by weight of total composition; a compound having Chemical Structure I in 1 to 30% by weight of total composition, $R_1$—CONH—$[R_2$—NH—$R_3]_n$—HNOC—$R_4$ (Chemical structure I)

in which $R_1$, $R_2$, $R_3$ and $R_4$ are linear, branched or aromatic carbon-containing substituents having 2 to 26 carbon atoms and n is an integer ranges from 1 to 100, wherein each of the substituents comprises an alkyl group, a carbonyl group, a carboxylic group, an amine group, or an amide group.

It was found that the performance of the emulsion composition containing the set forth compound having Chemical Structure I shows significant improvement with respect to different formation composition. Particularly, the existence of the mentioned compound in the disclosed composition allows greater buffering capacity against different types of ions and pH variations in the treated wellbore as reported in the below examples. The presence of the mentioned compound synergizes the effect of the disclosed composition in reducing oil-water interfacial tension to promote the water-wet surfaces after the treatment. In addition to that, it also allows the penetration of the chemical into the formation pores near wellbore, reaching the precipitates or aggregates and caused the blockage near wellbore. This reconstitute the formation and into a flowable stream to remove the obstruction thereof.

To effectively remove the formation damage, the disclosed composition may contain a mixture of co-surfactants or additional one co-surfactant besides the aforementioned compound. According to the preferred embodiment, the additional co-surfactant can be used in the present invention is C3 to C18 alcohols, C3 to C18 alkyl lactates, lecithin, C3 to C18 fatty acids, alkane diols, amino acids, or any mixtures derived thereof. More preferably, the additional co-surfactant can be in an amount of 1 to 30% by weight of total composition.

Pursuant to the preferred embodiment, the non-aqueous phase of the disclosed composition can be any one or combination of natural plant oil, glycols, esters, fatty acid ester, terpenes, aromatic hydrocarbons, ester, glycol ethers, mineral oil, paraffin oil, diesel, and petroleum distillates. The non-aqueous phase of the present invention functions as a carrier to enable reaching of the emulsion to the formation rock surface or solid particle. Upon reaching the formation rock surface or solid particle, the composition is able to penetrate inside the pores and provide water-wet surfaces on the rock surface or solid particle.

According to one preferred embodiment, the surfactant can be a non-ionic surfactant selected from the group consisting of alkylphenolethoxylates, alcohol ethoxylates, polyoxypropylene glycols, polyoxyethylene mercaptans, long-chain carboxylic acid esters, glyceryl/polyglyceryl esters of natural fatty acids, propylene glycol esters, sorbitol esters, polyoxyethylene sorbitol esters, alkanolamides, tertiary acetylenic glycols and their ethoxylates, polyoxyethylene silicones, alkylpyrrolidones, alkylpolyglycosides, blockcopolymers, fluorinated nonionics, polydimethylsiloxane silicone non-ionics, bio surfactants.

Still, in another preferred embodiment, the surfactant can be an anionic surfactant selected from the group consisting of alkyl carboxylates, alkyl ether carboxylates, alkyl sulfonates, aryl sulfonates, alkylaryl sulfonates, alkyl ether sulfonates, lignin sulfonates, acyl alkyl taurates, sulfosuccinate esters, alkyl isethionates, alkyl sulfates, alkyl ether sulfates, fatty acid monoethanolamide sulfates, polyoxyethylenated fatty acid monoethanolamide sulfates, alkyl phosphoric and polyphosphoric acid esters, fluorinated anionics, acylated amino acid, sulfofatty acid methyl esters, acyl glutamates, acyl glycinates, acyl alaninates, Nopolalkoxylates.

Further, in another embodiment, the surfactant can be a cationic surfactant selected from the group consisting of long-chain alkyl amines and the derived salts, alkyl acylated diamines/polyamines and the derived salts, alkyl quaternary ammonium salts, polyoxyethylenated long-chain alkyl amines, quaternized polyoxyethylenated long-chain alkyl amines.

Another preferred embodiment of the disclosed composition further comprises corrosion inhibitor. The corrosion inhibitors is more preferably chosen from phosphate esters, amine salts of carboxylic acid, amine salts of polycarboxylic acid, quaternary ammonium salts, quaternary imminium salts, amidoamines, imidazolines, amides, polyhydroxy amines, polyhydroxy amides, ethoxylated amines, ethoxylated amides, polyaminoacides or any combination derived thereof. The composition preferably has the corrosion inhibitor prepared in 1 to 5% by weight of the total composition.

The produce water in the formation may contain metal ions that prone to form scale or react with the surfactants in the disclosed composition. Thus, a chelating agent can be incorporated into the disclosed composition with a concentration of 1 to 25% by weight of total composition selected from the group consisting of ethylenediaminetetraacetic acid, hydroxyethylenediaminetriacetic acid, nitriolotriacetic acid, citric acid, acetylacetone, porphyrin, catechol, dithiolenephosphonic acids and their salts, polyphosphates, phosphate esters, nonpolymericphosphonates, aminophosphonates, polyphosphonatesphosphino polymers, polyphosphinates, polycarboxylates, polysulfonates and any combination derived thereof.

Paraffins are sometimes precipitates as solid or gel-like sticky substance that causes the damage to the near-wellbore. When the crude oil is produced from the formation, the temperature inside the wellbore and tubing will reduce gradually, and once the temperature is below the melting point or wax appearance temperature, paraffin wax precipitates. Sometimes this happens at the near-wellbore where there is drop in pressure and temperature. Thus the composition in the present invention may further comprising a pour point depressant and/or wax inhibitors to further reduce the effect of paraffin precipitation. The pour point depressant and/or wax inhibitors can be any one or combination ethylene/alkene copolymers, ethylene/vinyl acetate copolymers, ethylene acrylonitrile copolymers, acrylate ester polymers, methacrylate ester polymers, maleic copolymers, alkyl phenol-formaldehyde resins, hexatriethanolamineoleate esters, polyolefin or any combination thereof in 5 to 40% by weight of total composition.

Preferably, the disclosed composition is prepared from biodegradable elements to minimize negative impact towards the surrounding environment of the treated wellbore. Utilization of biodegradable components subjects the disclosed composition to potential decomposition from biological agent such as bacteria and fungus prior to applying the disclosed composition in use. To prolong shelf life and prevent uncontrolled growth of microorganisms, the disclosed composition further comprises a biocide in 1 to 5% by weight of total composition. The biocide prohibits growth of biological agent. The biocide used in the present invention can be of oxidizing biocides or non-oxidizing biocides. For oxidizing biocide, it can be any one or combination of chlorine/hypochlorite or bromide/hypochlorite, hypochlorite salts, hypobromite salts, stabilized bromine chloride, hydroxyl radicals, chloramines, chlorine dioxide, chloroisocyanurates, halogen-containing hydantoins, hydrogen peroxide and hydrogen peracetic acid in 1 to 5% by weight of total composition. On the other hand, a non-oxidizing biocide can be selected from the group consisting of any one or combination of aldehyde biocides, quaternary phosphonium compounds, quaternary ammonium surfactants, cationic polymers, organic bromides, metronidazole, isothiazoles, isothiazolinones, thiones, organic thiocyanates, phenolic biocide, alkylamines, diamines, triamines, dithiocarbamates, 2-(decylthio)ethanamine and its hydrochloride, triazine derivatives, and oxazolidines in 1 to 5% by weight of total composition.

The disclosed composition can be injected directly into the near-wellbore formation to react with the precipitates and deposits. The injected composition may be retained in the formation site for few hours to days. The injected composition can be further pushed into the formation via huff-and-puff or direct injection approach to accelerate the dispersion and dissolution of the precipitates and deposits. In another mode of action, the disclosed composition is mixed with a hydrocarbon solvent as carrier to substantially soak the near-wellbore formation damage zone for efficient cleaning. The non-aqueous phase can be any one or combination of natural plant oil, glycols, esters, fatty acid ester, terpenes, aromatic hydrocarbons, ester, glycol ethers, mineral oil, paraffin oil, diesel, and petroleum distillates and crude oil. Efficiency of the disclosed composition can be further enhanced by pre-flushing or pre-conditioning the formation with light hydrocarbons such as aromatics, mineral oil, paraffin oil, diesel, plant-based oil, and petroleum distillates. Or in another mode of action, the disclosed composition can be further mixed with water, seawater, or brine with sodium, potassium, calcium, magnesium, zinc or ammonium salt. The amount of organic or inorganic salt can be adjusted to balance the hydrostatic pressure with the formation.

EXAMPLE

Example 1

The disclosed single phase microemulsion composition presented in following examples are water-in-oil microemulsion with the mean microemulsion size of smaller than 100 nm (measured at 25° C. by particle size analyzer; Malvern Zetasizer Nano ZS).

TABLE 1

Example of the disclosed compositions

| Component | 1 | Wt % | 2 | Wt % | 3 | Wt % | 4 | Wt % |
|---|---|---|---|---|---|---|---|---|
| Surfactant | Alkly Benzene sulfonate | 17 | Alkly Benzene sulfonate | | Alkyl Phenol Ethoxylate | 11 | Alkyl Polygluccoside | 12 |
| Cosurfactant 1 | n-butanol | 12 | | | | | Caprylic acid | 13 |
| Cosurfactant 2 | Amine diamide | 1 | Amine diamide | 2 | Amine diamide | 3 | Amine diamide | 1.5 |
| Non-aqueous phase | Aromatics | 60 | Aromatics | 80 | paraffin | 78 | Aromatics | 61.5 |
| Aqueous phase | Water | 10 | Water | 10 | Water | 8 | Water | 12 |
| Mean particle size (nm) | 89 | | 16 | | 21 | | 33 | |
| Turbidity (NTU) | 0 | | 0 | | 0 | | 0 | |

Example 2

Composition as shown in Example 1 was tested on Sample 1 and 2.

Sample 1 and 2 were deposits collected from two different wells. Sample 1 was in a paste form and collected from well with bottomhole temperature of 60° C. Sample 2 was from another well with bottomhole temperature of 90° C. The properties of Sample 1 and 2 are shown in Table 2.

Sample 1 Test:

Sample 1 was subject to a treatment at room temperature using additives or 5% dosage of the disclosed composition so as to dissolve wax/asphaltene therein. The additives used can be diesel, white spirit, kerosene, xylenes, or toluene. The viscosity reduction, emulsion breaking and wax/asphaltene precipitation of Sample 1 after the treatment was shown in Table 3.

It was found that the disclosed composition is more effective in reducing the viscosity of Sample I at a dosage of 5 wt %. The viscosity of the sample reduced from ≥20,000 cP to below 10 cP after adding 5% or below of the disclosed composition. At viscosity below 10 cP, the samples become easily pourable at 25° C. Moreover, the dosing of the disclosed composition could also break the emulsion and prevent the precipitation of wax and asphaltene.

Sample 2 Test:

Dissolution and dispersion of Sample 2 after the treatment with the Sample 2/additive ratio of 1/10 were examined and observed through the precipitation of the wax/asphaltene. The results are shown in Table 4. The disclosed composition inhibits the precipitation of the extracted wax/asphaltene better than additives such as diesel, white spirit, kerosene, xylenes, and toluene.

TABLE 2

The properties of wax/asphaltene/water mixture extracted.

| Property | Sample 1 | Sample 2 |
|---|---|---|
| Extracted temperature (° C.) | 60 | 90 |
| Form | Paste | Solid |
| Solubility in n-Pentane | Insoluble | Insoluble |
| Viscosity at 25° C. (cP) | >20,000 | Unmeasurable |
| Pour point (° C.) | >70 | >100 |
| Wax/Asphaltene % Volume | 40-70 | 100 |

TABLE 3

Viscosity reduction, emulsion breaking and wax/asphaltene precipitation of Sample 1 after treated with the additives

| Additives | % Additive dosage | Viscosity (cP) | Porability at 25° C. | Emulsion Breaking | Wax/Asphaltene precipitation after 24 hours at 25° C. |
|---|---|---|---|---|---|
| None | 0% | >20,000 | Non-Pourable | No | Yes |
| Diesel | 5% | >20,000 | Non-Pourable | No | Yes |
| White spirit | 5% | >20,000 | Non-Pourable | No | Yes |
| Keroene | 5% | >20,000 | Non-Pourable | No | Yes |
| Xylene | 5% | >20,000 | Non-Pourable | No | Yes |
| Toluene | 5% | >20,000 | Non-Pourable | No | Yes |
| Disclosed composition | 5% | 4.8 | Pourable | Yes, Immediate | No |
| | 0.5% | 5.4 | Pourable | Yes, Immediate | No |

TABLE 4

Dissolution and dispersion of Sample 2 after the treatment under Sample 2/additive at a ratio of 1/10.

| Additives | Wax/asphaltene precipitation after 12 hours at 90° C. |
|---|---|
| Diesel | Yes |
| White spirit | Yes |
| Kerosene | Yes |
| Xylenes | Yes |
| Toluene | Yes |
| The disclosed composition | No |

The present disclosure includes as contained in the appended claims, as well as that of the foregoing description. Although this invention has been described in its preferred form with a degree of particularity, it is understood that the present disclosure of the preferred form has been made only by way of example and that numerous changes in the details of construction and the combination and arrangements of parts may be resorted to without departing from the scope of the invention.

The invention claimed is:

1. A microemulsion composition for treating formation damage at near-wellbore, comprising:
    an aqueous phase present in 0.5 to 40% by weight of total composition;

a non-aqueous phase present in 15 to 90% by weight of total composition;

a surfactant in 2 to 60% by weight of total composition;

a pour point depressant in 5 to 40% by weight of total composition; and a compound having a chemical structure I and present in a range of 1 to 30% by weight of total composition $$R_1\text{—CONH—}[R_2\text{—NH—}R_3]_n\text{—HNOC—}R_4 \quad \text{(Chemical structure I)}$$

wherein $R_1$ and $R_4$ are branched carbon containing constituents having 8 to 12 carbon atoms;

in which $R_2$ and $R_3$ are linear or branched carbon containing constituents having 2 to 4 carbon atoms;

n is an integer in a range of 2 to 6;

wherein each carbon containing constituents of $R_1$ and $R_4$ comprises an alkyl group, carbonyl group, or carboxylic group; and wherein each carbon containing constituents of $R_2$ and $R_3$ comprises an alkyl, amine, or amide group.

2. The composition according to claim 1, further comprising a co-surfactant including C3 to C18 alcohols and present in a range of 1 to 30% by weight of the total composition.

3. The composition according to claim 1, wherein the non-aqueous phase is selected from the group consisting of fatty acid ester and fatty ester.

4. The composition according to claim 1, wherein the surfactant is a non-ionic surfactant.

5. The composition according to claim 1, further comprising a corrosion inhibitor including imidazolines and present in a range of 1 to 5% by weight of the total composition.

6. The composition according to claim 1, wherein the pour point depressant comprises ethylene/vinyl acetate copolymers.

7. The composition according to claim 1, further comprising a chelating agent including ethylenediaminetetraacetic acid and present in a range of 1 to 25% by weight of the total composition.

8. The composition according to claim 1, further comprising a biocide including chlorine/hypochlorite and present in a range of 1 to 5% by weight of the total composition.

9. The composition according to claim 2, wherein the surfactant and co-surfactant is in a ratio of 20:1 to 1:20.

* * * * *